United States Patent
Inoue et al.

(10) Patent No.: US 6,480,873 B1
(45) Date of Patent: Nov. 12, 2002

(54) POWER OPERATION DEVICE

(75) Inventors: Yoshitsugu Inoue, Tokyo (JP); Hiroyuki Kawai, Tokyo (JP); Junko Kobara, Tokyo (JP); Robert Streitenberger, Tokyo (JP); Keijiro Yoshimatsu, Tokyo (JP); Hiroyasu Negishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/478,004

(22) Filed: Jan. 5, 2000

(30) Foreign Application Priority Data

Jun. 23, 1999  (JP) .......................................... 11-177368

(51) Int. Cl.$^7$ ................................................ G06F 7/38
(52) U.S. Cl. ...................................... 708/606; 708/512
(58) Field of Search ................................ 708/606, 512, 708/277

(56) References Cited

U.S. PATENT DOCUMENTS

| | | | | |
|---|---|---|---|---|
| 5,926,406 A | * | 7/1999 | Tucker et al. ............... | 708/512 |
| 6,128,638 A | * | 10/2000 | Thomas ....................... | 708/512 |
| 6,182,100 B1 | * | 1/2001 | Schmookler ................ | 708/512 |

FOREIGN PATENT DOCUMENTS

| | | |
|---|---|---|
| DE | 40 33 507 | 7/1992 |
| JP | 10-207694 | 8/1998 |

OTHER PUBLICATIONS

P.J. Plauger, "The Standard C Library", pp. 157–169, Prentice–Hall, Inc., Published 1992.

M. Hirabayashi, "ANSI C Language Dictionary", Gijyutsu–Hyoron, Co., Ltd., Published Oct. 25, 1989 (w/ English abstract).

* cited by examiner

Primary Examiner—Tan V. Mai
(74) Attorney, Agent, or Firm—Burns, Doane, Swecker & Mathis, LLP

(57) ABSTRACT

A power operation device comprises a bit operation unit or performing a bit shift operation on a logarithmic base bit string from a logarithm operation unit according to an input exponent bit string Y, and for furnishing the shifted logarithmic base bit string as a multiplication bit string. An exponent checking unit checks whether or not the input exponent bit string Y is the $i^{th}$ power of a base 2 where i is an integer, and, if so, furnishes a selection signal to direct selection of the multiplication bit string from the bit operation unit. A multiplication bit string selection unit selects and furnishes the multiplication bit string when it receives the selection signal from the exponent checking unit. In contrast, the multiplication bit string selection unit selects and furnishes another multiplication bit string from a multiplier otherwise. An exponential operation unit performs a base-2 exponential operation on the selected multiplication bit string from the multiplication bit string selection unit, i.e., computes $2^Z$ where Z is the selected multiplication bit string, and furnishes the computed base-2 exponential value as the power operation-result $X^Y$.

13 Claims, 3 Drawing Sheets

POWER OPERATION DEVICE

BACKGROUND OF THE INVENTION

1. Field of the Invention

The present invention relates to a power operation device for performing a power operation on an input base bit string and an input exponent bit string. More particularly, it relates to a power operation device having an improved means for substantially increasing the operation speed of the device.

2. Description of the Prior Art

Referring next to FIG. 3, there is illustrated a block diagram showing the structure of a prior art power operation device as disclosed in Japanese Patent Application Publication (TOKKAIHEI) No. 10-207694. In the figure, reference numeral 24 denotes a logarithm operation unit, numeral 25 denotes a multiplier, numeral 26 denotes an exponential operation unit, numeral 27 denotes a shift unit, numeral 28 denotes a logarithm table, numeral 29 denotes an addition section, numeral 30 denotes a subtraction section, numeral 31 denotes an exponential table, and numeral 32 denotes a shift section.

In operation, after the shift section 27 divides a base bit string X applied thereto into its fractional part and its integer part, the logarithm operation unit 24 acquires the logarithm of the fractional part using the logarithm table 28 and the addition section 29 then generates a logarithmic base bit string from the logarithm of the fractional part and the integer part of the input base bit string X. The multiplier 25 then multiplies the logarithmic base bit string by an exponent bit string Y applied thereto, and furnishes the multiplication result to the exponential operation unit 26. In the exponential operation unit 26, the subtraction section 30 divides the multiplication result from the multiplier 25 into its fractional part and its integer part. The exponential operation unit 26 then computes an exponential value in a specific floating-point representation, the exponential value corresponding to the fractional part of the output of the multiplier 25, using the exponential table 31. The exponent shift unit 32 then generates the power operation result from the exponential value and the integer part of the multiplication result from the multiplier 25.

In this manner, the prior art power operation device can compute the logarithm of the base bit string X and transform the power operation with the base bit string X and the exponent bit string Y into the multiplication of the logarithm of the base bit string X and the exponent bit string Y, thus reducing the time required for acquiring the power operation result as compared with a prior art method in which the $Y^{th}$ power of X is computed by iterating an arithmetic operation using logarithm and exponent functions which are expanded into power series.

A problem with the prior art power operation device is that it processes all power operations in the same way, and therefore it cannot speed up the power computation process beyond the operation speed of the multiplier built in the prior art power operation device.

SUMMARY OF THE INVENTION

The present invention is made to overcome the above problem. It is therefore an object of the present invention to provide a power operation device capable of speeding up some specific power operations frequently used, thus substantially increasing the power operation speed of the device.

In accordance with one aspect of the present invention, there is provided a power operation device for performing a power operation on an input base bit string X and an input exponent bit string Y so as to compute $X^Y$, the device comprising: a logarithm operation unit for performing a base-2 logarithm operation on the input base bit string X and for furnishing a logarithmic base bit string corresponding to the base-2 logarithm of the input base bit string X; a multiplier for multiplying the logarithmic base bit string by either a bit string equivalent to the input exponent bit string Y or the input exponent bit string Y, and for furnishing a multiplication result as a first multiplication bit string; a bit operation unit for performing a bit shift operation on the logarithmic base bit string from the logarithm operation unit according to the input exponent bit string Y, and for furnishing the shifted logarithmic base bit string as a second multiplication bit string; an exponent checking unit for checking whether or not the input exponent bit string Y is the $i^{th}$ power of a base 2 where i is an integer, and for, if so, furnishing a selection signal to direct selection of the second multiplication bit string; a multiplication bit string selection unit for receiving both the first multiplication bit string from the multiplier and the second multiplication bit string from the bit operation unit, for selecting and furnishing the second multiplication bit string when it receives the selection signal from the exponent checking unit, and for selecting and furnishing the first multiplication bit string otherwise; and an exponent operation unit for performing a base-2 exponential operation on the selected first or second multiplication bit string from the multiplication bit string selection unit, i.e., computing $2^Z$ where Z is the selected first or second multiplication bit string, and for furnishing the computed base-2 exponential value as the power operation result $X^Y$.

Preferably, the exponent checking unit checks whether or not the input exponent bit string Y is ½, and furnishes the selection signal to the multiplication bit string selection unit if so. The bit operation unit then shifts the logarithmic base bit string from the logarithm operation unit right for one bit position and furnishes the shifted logarithmic base bit string as the second multiplication bit string to the multiplication bit string selection unit.

Preferably, the exponent checking unit checks whether or not the input exponent bit string Y is −1, and furnishes the selection signal to the multiplication bit string selection unit if so. The bit operation unit then inverts the logarithmic base bit string from the logarithm operation unit and furnishes the inverted logarithmic base bit string as the second multiplication bit string to the multiplication bit string selection unit.

Preferably, the exponent checking unit checks whether or not the input exponent bit string Y is −½, and furnishes the selection signal to the multiplication bit string selection unit if so. The bit operation unit then shifts the logarithmic base bit string from the logarithm operation unit right for one bit position and further inverts the shifted logarithmic base bit string, and furnishes the shifted and inverted logarithmic base bit string as the second multiplication bit string to the multiplication bit string selection unit.

In accordance with a preferred embodiment of the present invention, the input base bit string X is a bit string in a certain floating-point representation, and the logarithm operation unit includes an argument processing section for computing the logarithm of an argument of the input base bit string X using a base-2 logarithm operation table, a characteristic processing section for subtracting a predetermined characteristic offset value from a characteristic part of the input base bit string X and for furnishing a subtraction result, and a fixed-point bit string generating section for generating the logarithm of a fixed-point base bit string corresponding to the input floating-point bit string X based on the logarithm of the argument of the input base bit string X from the argument processing section and the subtraction result from the characteristic processing section. The logarithm operation unit can furnish the logarithm of the fixed-point base bit string from the fixed-point bit string generating section as the logarithmic base bit string.

The logarithm operation unit can further include a fixed value holding section for holding the base-2 logarithm of the Napierian number, a base checking section for checking whether or not the input base bit string X is the Napierian number, and for furnishing a fixed value selection signal to direct selection of the base-2 logarithm of the Napierian number if so, and a base output selection section for receiving both the logarithm of the fixed-point base bit string from the fixed-point bit string generating section and the base-2 logarithm of the Napierian number from the fixed value holding section, and for selecting and furnishing the base-2 logarithm of the Napierian number as the logarithmic base bit string when it receives the fixed value selection signal from the base checking section and for selecting and furnishing the logarithm of the fixed-point base bit string as the logarithmic base bit string otherwise.

In accordance with another preferred embodiment of the present invention, the input exponent bit string Y is a bit string in a certain floating-point representation, and the power operation device further includes an exponent processing unit for converting the input exponent bit string Y into an equivalent exponent bit string in a certain fixed-point representation defined by the multiplier.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
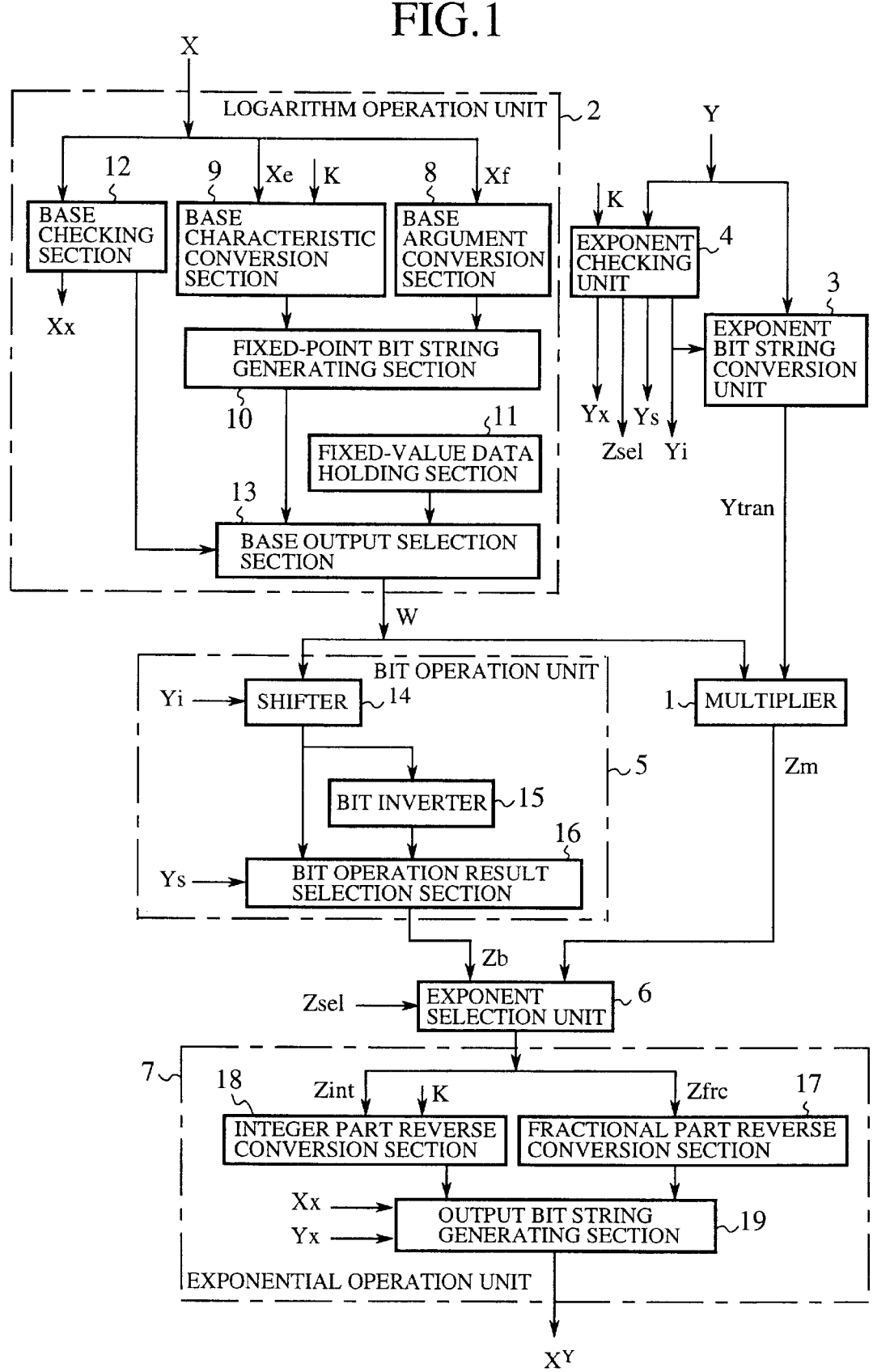
FIG. 1 is a block diagram showing the structure of a power operation device according to a first embodiment of the present invention.

Referring next to FIG. 1, there is illustrated a block diagram showing the structure of a power operation device according to a first embodiment of the present invention. The power operation device performs a power operation on both a first input floating-point bit string showing a base X and a second input floating-point bit string showing an exponent Y and generates an operation result showing the $Y^{th}$ power of the base X, i.e., $X^Y$. In the figure, reference numeral 1 denotes a multiplier for multiplying an input bit string by another input bit string while handling them as bit strings in a certain fixed-point representation, and for furnishing the multiplication result as a first multiplication bit string Zm, numeral 2 denotes a logarithm operation unit for converting the input base bit string X applied thereto into an equivalent base bit string in a certain fixed-point representation defined by the multiplier 1, i.e., a fixed-point base bit string, and for performing a base-2 logarithm operation on the fixed-point base bit string and furnishing the logarithm result as a fixed-point logarithmic base bit string W to the multiplier 1, numeral 3 denotes an exponent bit string conversion unit for converting the input exponent bit string Y applied thereto into an equivalent exponent bit string in the fixed-point representation defined by the multiplier 1, i.e., a fixed-point exponent bit string Ytran so as to furnish the conversion result to the multiplier 1, numeral 4 denotes an exponent checking unit for generating various operation control signals Yx, Zsel, Ys, and Yi based on the input exponent bit string Y, numeral 5 denotes a bit operation unit for performing bit operations, such as a shift operation and an inversion operation, on the fixed-point logarithmic base bit string w according to the operation control signals Yi and Ys, and for furnishing the operation result as a second multiplication bit string Zb, numeral 6 denotes an exponent selection unit for selecting either the first multiplication bit string Zm or the second multiplication bit string Zb applied thereto according to the operation control signal Zsel, and for furnishing the selected bit string as a selected multiplication bit string Z, and numeral 7 denotes an exponential operation unit for performing a base-2 exponential operation on the selected multiplication bit string Z applied thereto, i.e., computing $2^Z$, and for reverse-converting the operation result into a bit string in the same floating-point representation as the input base string bit X and furnishing the operation result as the power operation result based on the input base bit string X and the input exponent bit string Y, i.e., $X^Y$.

The logarithm operation unit 2 includes a base argument conversion section 8 for computing and furnishing the base-2 logarithm of (the argument Xf of the input base bit string X+1) using a base-2 logarithm operation table, a base characteristic part conversion section 9 for subtracting a predetermined exponent offset value K from the characteristic part Xe of the input base bit string X and for furnishing the subtraction result (Xe−K), a fixed-point bit string generating section 10 for generating and furnishing a fixed-point bit string in the fixed-point representation defined by the multiplier 1 based on the base-2 logarithm of (the argument Xf+1) from the base argument conversion section 8 and the subtraction result (Xe−K) from the characteristic part conversion section 9, a fixed-value data holding unit 11 for holding the base-2 logarithm of the Napierian number e, i.e., $\log_2 e$ which is a fixed-point bit string in the fixed-point representation defined by the multiplier 1, and for furnishing the base-2 logarithm of the Napierian number e, a base checking section 12 for furnishing a fixed-value data selection signal when the input base bit string X applied thereto is the Napierian number e, and a base output selection section 13 for selecting the fixed-value bit string from the fixed-value data holding unit 11 and furnishing it as the fixed-point logarithmic base bit string W when receiving the fixed-value data selection signal, and for selecting the fixed-point bit string from the fixed-point bit string generating section 10 and furnishing it as the fixed-point logarithmic base bit string W otherwise.

The bit operation unit 5 includes a shifter 14 for shifting the fixed-point logarithmic base bit string W from the logarithm operation unit 2 for a number of bits which is determined according to the input exponent bit string Y, a bit inverter 15 for inverting the output of the shifter 14, and a bit operation result selection section 16 for selecting either the output of the shifter 14 or the output of the bit inverter 15 according to the input exponent bit string Y, and for furnishing the selected output as the second multiplication bit string Zb to the exponent selection unit 6.

The shifter 14 performs the shift operation according to the operation control signal Yi from the exponent checking unit 4. Similarly, the bit operation result selection section 16 performs the selection operation according to the operation control signal Ys from the exponent checking unit 4. To be more specific, the exponent checking unit 4 checks whether or not the input exponent bit string Y is the $i^{th}$ power of a base 2 where i is an integer. If so, the exponent checking unit 4 furnishes the operation control signal Yi representing the integer i to the shifter 14. When the integer i is negative, the shifter 14 then shifts the fixed-point logarithmic base bit string W right for the same number of bits as the integer i. In contrast, when the integer i is positive, the shifter 14 then shifts the fixed-point logarithmic base bit string W left for the same number of bits as the integer i. In this case, the exponent checking unit 4 simultaneously furnishes the operation control signal Zsel to the exponent selection unit 6. The exponent checking unit 4 also checks whether the sign of the input exponent bit string Y is positive or negative, and then furnishes the operation control signal Ys to direct the bit operation result selection section 16 to select the inverted bit string from the bit inverter 15 when the sign of the input exponent bit string Y is negative. The bit operation result selection section 16 then selects the output of the bit inverter 15 according to the operation control signal Ys. The operation control signal Ys thus indicates the sign of the input exponent bit string Y.

When the input exponent bit string Y is the $i^{th}$ power of a base 2, where i is an integer, the exponent selection unit 6 selects the output of the bit operation unit 5 according to the operation control signal Zsel from the exponent checking unit 4 and then furnishes it as the selected multiplication bit string Z. Otherwise, the exponent selection unit 6 selects the output of the multiplier 1 and then furnishes it as the selected multiplication bit string Z.

The exponential operation unit 7 includes a fractional part reverse conversion section 17 for computing the fractional part Zf of $2^{Zfrc}$, i.e., the argument of $2^Z$, where Zfrc is the fractional part of the selected multiplication bit string Z, by using a base-2 power table, an integer part reverse conversion section 18 for adding the exponent offset value K to the integer part Zint of the selected multiplication bit string Z to compute an offset characteristic part Ze in a certain floating-point representation, and an output bit string generating section 19 for generating an output bit string having the same floating-point representation as the input base bit string X based on the fractional part Zf and the offset characteristic part Ze, and for furnishing the output bit string as the power operation result bit string.

When the input base bit string X is negative, the base checking unit 12 can furnish a notification signal Xx notifying the output bit string generating section 19 of the fact. When the input exponent bit string Y is not an integer, the exponent checking unit 4 furnishes a notification signal Yx notifying the output bit string generating section 19 of the fact. The power calculation cannot be mathematically defined when the input base bit string X is negative and the input exponent bit string Y is not an integer. Therefore the output bit string generating unit 19 furnishes zero as the power operation result in this case.

When the base argument conversion section 8 receives the input base bit string X, it computes and furnishes the base-2 logarithm of (the argument Xf of the input base bit string X+1) using the base-2 logarithm operation table. The base characteristic part conversion section 9 simultaneously subtracts the given exponent offset value K from the characteristic part Xe of the input base bit string X and then furnishes the subtraction result (Xe−K). The fixed-point bit string generating section 10 then generates and furnishes a fixed-point base bit string in the fixed-point representation defined by the multiplier 1 based on the logarithm of (the argument Xf+1) from the base argument conversion section 8 and the subtraction result (Xe−K) from the base characteristic part conversion section 9.

When the input base bit string X is equal to or greater than zero, the power operation is given by the following equation:

$$X^Y = e^{\{Y \times \log_e(X)\}} \qquad (1)$$

The input base string X can be shown in the floating-point representation with the exponent offset value K, as follows:

$$X = (1+Xf) \times 2^{(Xe-K)} \qquad (2)$$

where Xe is the characteristic part of X, and Xf ($0 \leq Xf < 1$) is the argument of X, as previously mentioned. Substituting the equation (2) into the equation (1) yields:

$$X = e^{\{Y \times \log_e((1+Xf) \times 2^{(Xe-K)})\}} \qquad (3)$$
$$= e^{[Y \times \{\log_2(1+Xf)+(Xe-K)\} \times \log_e 2]}$$

As previously mentioned, the base argument conversion section 8 generates a bit string having a value corresponding to $\log_2(1+Xf)$ using the base-2 logarithm operation table, and the base characteristic part conversion section 9 generates a bit string having a value corresponding to (Xe−K). The fixed-point bit string generating section 10 thus generates a bit string having a value corresponding to $\{\log_2(1+Xf)+(Xe-K)\}$.

When the input base bit string X is the Napierian number e, the above equation (3) can be transformed into the following equation (4):

$$X = e^{(Y \times \log_2 e \times \log^e 2)} \qquad (4)$$

The base checking section 12 determines whether or not the input base bit string X is the Napierian number e. If so, the base checking section 12 furnishes the fixed-value data selection signal. When the base output selection section 13 receives the fixed-value data selection signal from the base checking section 12, it selects the fixed-value data bit string having a value equal to $\log_2 e$ from the fixed-value data holding section 11 and furnishes the fixed-value data bit string, as the fixed-point logarithmic base bit string W, to both the bit operation unit 5 and the multiplier 1. Otherwise, the base output selection section 13 selects the fixed-point base bit string from the fixed-point bit string generating section 10 and then furnishes it as the fixed-point logarithmic base bit string W, to both the bit operation unit 5 and the multiplier 1. Accordingly, the power operation device according to the first embodiment can reduce the time required for the power calculation when the base is the Napierian number e (the Napierian number e is frequently used as the base).

The above equation (3) can be transformed into the following equation using the output W of the logarithm operation unit 2:

$$X = e^{(Y \times W \times \log^e 2)} \qquad (5)$$

When the input exponent bit string Y is the $i^{th}$ power of a base 2 where i is an integer, (Y×W) (actually Ytran×W) in the above equation (5) can be computed by shifting W for i bits if Y is positive. If Y is negative, (Y×W) can be computed by shifting W for i bits and then inverting the shifted result.

When the exponent checking unit 4 receives the input exponent bit string Y, it checks whether or not the input exponent bit string Y is the $i^{th}$ power of a base 2, i.e., $2^i$, where i is an integer, by determining whether or not the argument Yf of the input exponent bit string Y is zero. If so, the exponent checking unit 4 furnishes the operation control signal Zsel to the exponent selection unit 6 to direct it to select the second multiplication bit string Zb. The exponent checking unit 4 also computes the integer i by subtracting the exponent offset value K from the characteristic part Ye of the input exponent bit string Y and furnishes the operation control signal Yi representing the integer i to both the shifter 14 and the exponent bit string conversion unit 3. The exponent checking unit 4 further furnishes the operation control signal Ys indicating the sign of the input exponent bit string Y to the bit operation result selection section 16. The exponent bit string conversion unit 3 then converts the floating-point exponent bit string Y applied thereto into an equivalent fixed-point exponent bit string Ytran in the given fixed-point representation defined by the multiplier 1 by shifting (1+ the argument Yf of the floating-point exponent bit string Y) according to the operation control signal Yi. When the integer i indicated by the operation control signal Yi is positive, the exponent bit string conversion unit 3 shifts (1+Yf) left for a number of bits corresponding to the integer i. When the integer is negative, the exponent bit string conversion unit 3 shifts (1+Yf) right for a number of bits corresponding to the integer i.

The multiplier 1 then multiplies the fixed-point exponent bit string Ytran from the exponent bit string conversion unit 3 by the fixed-point logarithmic base bit string W from the logarithm operation unit 2, and furnishes the multiplication result (Ytran×W) as the first multiplication bit string Zm to the exponent selection unit 6. The first multiplication bit string Zm has a value equal to $[Y \times \{\log_2(1+Xf)+(Xe-K)\}]$ as shown in the equation (3).

At the-same time that the multiplier 1 performs the multiplication operation, the bit operation unit 5 can-perform a bit operation on the fixed-point logarithmic base bit string W from the logarithm operation unit 2 according to the operation control signals Yi and Ys from the exponent checking unit 4, and then furnishes the operation result as the second multiplication bit string Zb. To be more specific, the shifter 14 shifts the fixed-point logarithmic base bit string W for a number of bits corresponding to the value of the operation control signal Yi and hence the input exponent bit string Y. The bit inverter 15 then inverts the output of the shifter 14. The bit operation result selection section 16 selects the output of the bit inverter 15 and furnishes it as the second multiplication bit string Zb to the exponent selection unit 6 according to the operation control signal Ys, that is, when the sign of the input exponent bit string Y is negative. The bit operation result selection section 16 selects the output of the shifter 14 and furnishes it as the second multiplication bit string Zb to the exponent selection unit 6 otherwise. The exponent selection unit 6 then selects the output of the bit operation unit 5 when the operation control signal Zsel indicates that the input exponent bit string Y is the $i^{th}$ power of a base 2 where i is an integer, and selects the output of the multiplier 1 otherwise. The exponent selection unit 6 then furnishes the selected output as the selected multiplication bit string Z to the exponential operation unit 7.

As previously mentioned, when the input exponent bit string Y is the $i^{th}$ power of a base 2 where i is an integer, the bit operation unit 5 can generate the second multiplication bit string Zb having a value equal to the multiplication of the converted exponent bit string Ytran and the fixed-point logarithmic base bit string W by shifting the fixed-point logarithmic base bit string W for a number of bits corresponding to the integer i. Since higher-order bits have to wait for carries from lower-order bits to generate a final operation result in general multiplication operations, much time is spent in acquiring the final operation result. In contrast, the shifter 14 does not need such waiting time, thus speeding up the power operation by the length of the waiting time.

The above equation (3) can be transformed into the following equation (6):

$$X^Y = e^{\log_e 2[Y\times\{\log_2(1+Xf)+(Xe-K)\}]} \qquad (6)$$
$$= 2^{[Y\times\{\log_2(1+Xf)+(Xe-K)\}]}$$

Further, the above equation (6) can be shown as follows:

$$X^Y = 2^Z \qquad (7)$$
$$= 2^{Zint} \times 2^{Zfrc}$$

where Zfrc is the fractional part of the output Z (i.e., $[Y\times\{\log_2(1+Xf)+(Xe-K)\}]$) of the exponent selection unit 6, Zint is the integer part of the output Z of the exponent selection unit 6. Since the fractional part Zfrc is equal to or greater than zero and is less than one, $2^{Zfrc}$ is equal to or greater than one and is less than two. As can be seen from the comparison between the above equation (6) and the above equation (1), $2^{frc}$, which is furnished by the fractional part reverse conversion section 17, corresponds to the argument of the power operation result in the given floating-point representation. The fractional part reverse conversion section 17 obtains the fractional part Zf of $2^{Zfrc}$, i.e., the argument of $2^Z$ by using the base-2 power table. The base-2 power table stores only the fractional part of each of a number of $p^{th}$ powers of a base 2, where p is equal to or greater than 0 and is less than one, and therefore furnishes the fractional part Zf of $2^{Zfrc}$ when it is addressed by Zfrc. In other words, the output of the base-2 power table does not include the integer part of $2^{Zrc}$ having a value of one. The integer part reverse conversion section 18 adds the exponent offset value K to the integer part Zint of the selected multiplication bit string Z to compute an offset characteristic part Ze having the same representation as the characteristic part of the power operation result in the given floating-point representation. Accordingly, the above equation (7) can be transformed into the following equation (8):

$$X^Y = (1+Zf) \times 2^{(Ze-K)} \qquad (8)$$

The output bit string generating section 19 then 10 generates an output bit string having a value given by the above equation (8) and having the same representation as the input base bit string X, based on the argument Zf from the fractional part reverse conversion section 17 and the offset characteristic part Ze from the integer part reverse conversion section 18, and furnishes the output bit string as the power operation result bit string. When the input base bit string X has a negative value and the input exponent bit string Y is not an integer, the output bit string generating section 19 furnishes zero as the power operation result bit string.

Next, a description will be made as to some power operations frequently used, such as extraction of a square root, a reciprocal calculation of a number, and the normalized arithmetic.

In extraction of a square root, the input exponent bit string Y is ½ (=$2^{-1}$) and is therefore the $i^{th}$ power of a base 2 where i is an integer. In this case, the integer (or exponent) i is −1. The shifter 14 thus shifts the logarithmic base bit string W from the logarithm operation unit 2 right for one bit position. The output of the shifter 14 is then furnished, as the second multiplication bit string Zb, to the exponent selection unit 6 by the bit operation result selection section 16. The exponent selection unit 6 selects the output of the shifter 14 and furnishes it to the exponential operation unit 7. Thus the power operation device of the first embodiment can allow the exponent selection unit 6 to select the output of the shifter 14 without having to wait for the operation result of the multiplier 1, and then furnish the power operation result.

In a reciprocal calculation of a number, the input exponent bit string Y is −1 (=$-1 \times 2^0$) and is therefore the $i^{th}$ power of a base 2 where i is an integer. In this case, the integer i is 0. The shifter 14 thus furnishes the logarithmic base bit string W from the logarithm operation unit 2, just as it is. The bit inverter 15 inverts the logarithmic value W. The inverse of the logarithmic value W from the bit inverter 15 is then furnished, as the second multiplication bit string Zb, to the exponent selection unit 6 by the bit operation result selection section 16. The exponent selection unit 6 selects the inverse of the logarithmic value W and furnishes it to the exponential operation unit 7. Thus the power operation device of the first embodiment can allow the exponent selection unit 6 to select the inverse of the logarithmic value W without having to wait for the operation result of the multiplier 1, and then furnish the power operation result.

In the normalized arithmetic, the input exponent bit string Y is −½ (=$-1 \times 2^{-1}$) and is therefore the $i^{th}$ power of a base 2 where i is an integer. In this case, the integer i is −1. The shifter 14 thus shifts the logarithmic base bit string W from the logarithm operation unit 2 right for one bit position. The bit inverter 15 inverts the output of the shifter 14. The output of the bit inverter 15 is then furnished, as the second multiplication bit string Zb, to the exponent selection unit 6 by the bit operation result selection section 16. The exponent selection unit 6 further selects the output of the bit inverter 15 and furnishes it to the exponential operation unit 7. Thus the power operation device of the first embodiment can allow the exponent selection unit 6 to select the output of the bit inverter 15 without having to wait for the operation result of the multiplier 1, and then furnish the power operation result.

As previously mentioned, in accordance with the first embodiment of the present invention, there is provided a power operation device for performing a power operation on an input base bit string X and an input exponent bit string Y, the device comprising the logarithm operation unit 2 for performing a base-2 logarithm operation on the input base bit string X and for furnishing a logarithmic base bit string W corresponding to the logarithm of the input base bit string X to the multiplier 1, the multiplier 1 for multiplying a converted exponent bit string Ytran by the logarithmic base bit string W and for furnishing the multiplication result as a first multiplication value Zm, the bit operation unit 5 for performing at least a shift operation on the logarithmic base bit string W according to the input exponent bit string Y, and for furnishing the operation result as a second multiplication value Zb; the exponent checking unit 4 for determining whether or nor the input exponent bit string Y is the $i^{th}$ power of a base 2 where i is an integer, and for furnishing a selection signal to direct the exponent selection unit 6 to select the second multiplication value if so, the exponent selection unit 6 for selecting either the first multiplication value Zm or the second multiplication value Zb applied thereto according to the selection signal from the exponent checking unit 4, and for furnishing the selected bit string as a selected multiplication value Z, and the exponential operation unit 7 for performing a base-2 exponential operation on the selected multiplication value Z applied thereto, and for furnishing the operation result as the power operation result based on the input base bit string X and the input exponent bit string Y. Accordingly, the power operation device can compute the $Y^{th}$ power of X using the operation result of the bit operation unit 5 when the input exponent bit string Y is the $i^{th}$ power of a base 2 where i is an integer.

For example, in such an arithmetic operation as extraction of a square root where the input exponent bit string Y is ½, a reciprocal calculation of a number where the input exponent bit string Y is −1, and the normalized arithmetic where the input exponent bit string Y is −½, the power operation device can compute the $Y^{th}$ power of the input base bit string X using the operation result of the bit operation unit 5 without having to use the multiplier 1. The first embodiment thus offers the advantage of being able to speed up such power operations frequently used, thus substantially increasing the power operation speed of the device.

In addition, according to the first embodiment of the present invention, the logarithm operation unit 2 includes the base argument conversion section 8 for computing and furnishing the base-2 logarithm of (Xf+1) from the argument Xf of the input floating-point base bit string X using the base-2 logarithm operation table, the base characteristic part conversion section 9 for subtracting the given exponent offset value K from the characteristic part Xe of the input base bit string X and for furnishing the subtraction result (Xe−K), and the fixed-point bit string generating section 10 for generating and furnishing a fixed-point logarithmic base bit string W based on the base-2 logarithm of (the argument Xf+1) and the subtraction result (Xe−K). Accordingly, the first embodiment offers the advantage of being able to receive the input base bit string X in a given floating-point representation constructed of the argument Xf of the base and the characteristic part Xe of the base and to perform a power operation on the input base bit-string X.

Furthermore, the logarithm operation unit 2 includes the fixed-value data holding unit 11 for holding the value of the base-2 logarithm of the Napierian number e (i.e., $\log_2 e$), the base checking section 12 for checking whether or not the input base bit string X is the Napierian number e, and for furnishing a fixed-value data selection signal when the input base bit string X is the Napierian number e, and the base output selection section 13 for selecting the base-2 logarithm of the Napierian number e and furnishing it as the fixed-point logarithmic base bit string W when receiving the fixed-value data selection signal, and for selecting the output of the fixed-point bit string generating section 10 and furnishing it as the fixed-point logarithmic base bit string W otherwise. Accordingly, when the input base bit string X is the Napierian number e, the base checking unit 12 furnishes the fixed-value data selection signal to the base output selection unit 13 so as to cause the base output selection unit 13 to select the base-2 logarithm of the Napierian number e as the fixed-point logarithmic base bit string W. Accordingly, the first embodiment offers the advantage of being able to eliminate the time required for searching the logarithm operation table when computing a power of the Napierian number e, thus substantially increasing the power operation speed of the device.

In addition, in accordance with the first embodiment of the present invention, since the power operation device includes the exponent bit string conversion unit 3 for shifting the input exponent bit string Y so as to convert the input exponent bit string Y into an equivalent exponent bit string Ytran in a certain fixed-point representation defined by the multiplier 1, the input exponent bit string Y can be a bit string in a floating-point bit string and therefore the power operation device can perform a power operation on the converted fixed-point exponent bit string Ytran.

Second Embodiment

Figure 2:
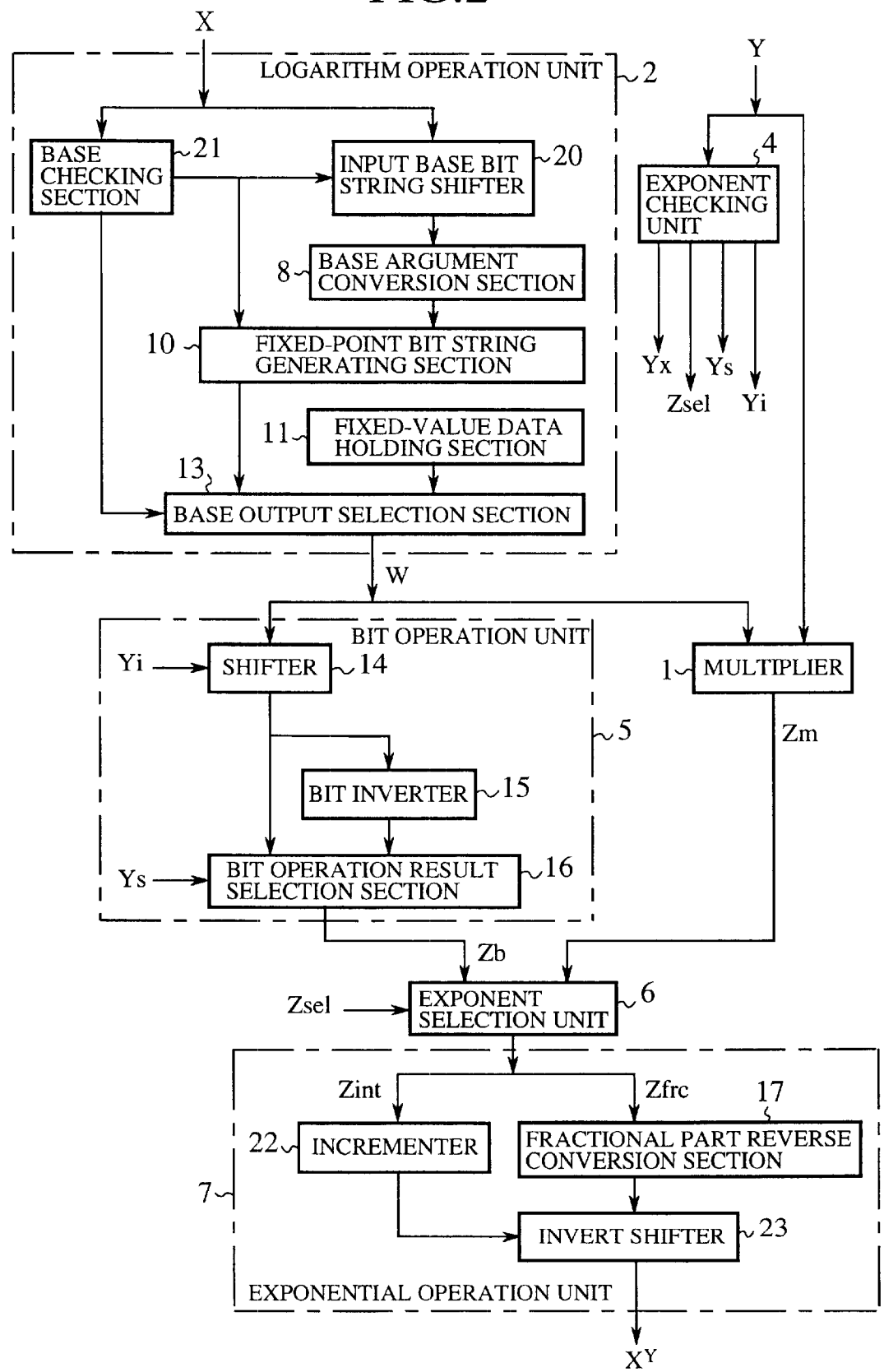
FIG. 2 is a block diagram showing the structure of a power operation device according to a second embodiment of the present invention.
Figure 3:
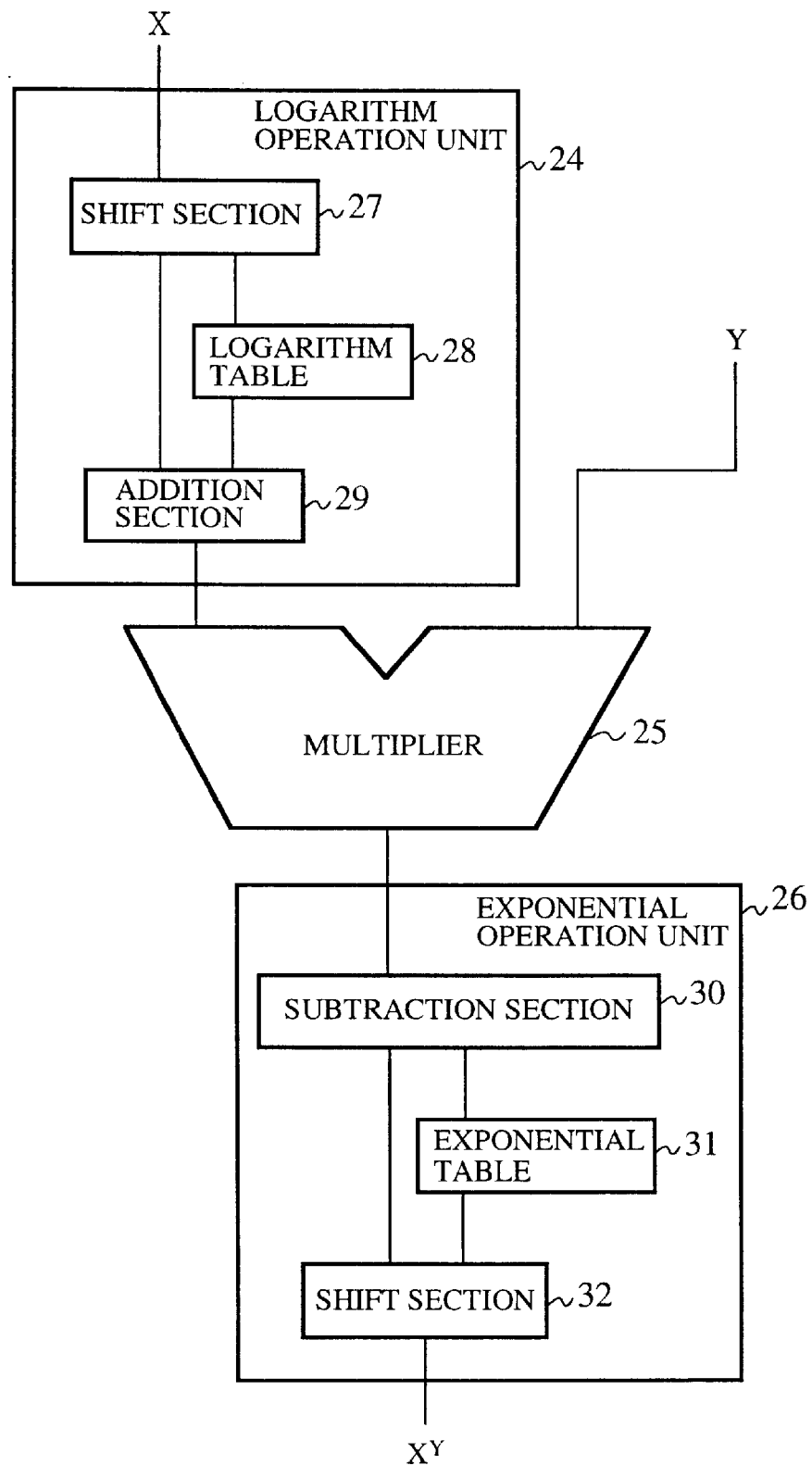
FIG. 3 is a block diagram showing the structure of a prior art power operation device.

Referring next to FIG. 2, there is illustrated a block diagram showing the structure of a power operation device according to a second embodiment of the present invention. In the figure, reference numeral 20 denotes an input base bit string shifter for shifting a fixed-point base bit string X applied thereto so as to convert the input base bit string into an equivalent bit string having a value equal to or greater than one and less than two, numeral 21 denotes a base checking section for checking whether or not the input base bit string X is the Napierian number e, for furnishing a fixed-value data selection signal to a base output selection section 13 if so, and for furnishing a direction signal to direct the shifter 20 to perform a shift operation on the input base bit string X, numeral 22 denotes an incrementer for adding one to the integer part Zint of a selected multiplication bit string Z from an exponent selection unit 6, and numeral 23 denotes an invert shifter for shifting the output of a fractional part reverse conversion section. 17 in a direction opposite to the direction in which the input base bit string X has been shifted by the shifter 20, according to the output of the incrementer 22. When the output of the incrementer 22 is positive, the invert shifter 23 shifts the output of the fractional part reverse conversion section 17 left for a number of bits corresponding to the output of the incrementer 22. When the output of the incrementer 22 is negative, the invert shifter 23 shifts the output of the fractional part reverse conversion section 17 right for a number of bits corresponding to the output of the incrementer 22. An input fixed-point exponent bit string Y is directly applied to a multiplier 1. The other structure of the power operation device of the second embodiment is the same as that, as shown in FIG. 1, of the power operation device of the aforementioned first embodiment, and the same components as of the power operation device of the aforementioned first embodiment are designated by the same reference numerals as shown in FIG. 1. Therefore, the description of the components will be omitted hereinafter.

In operation, when the base checking section 21 receives an input base bit string X, it checks whether or not the input base bit string X is the Napierian number e, and furnishes a direction signal to direct the shifter 20 to perform a shift operation on the input base bit string X. To be more specific, the base checking section 21 generates the direction signal so that the shifted base bit string X is equal to or greater than one and is less than two. To this end, the direction signal must be set to indicate a positive shift amount when in the input base bit string X the highest-order bit set to one is located on the side of the integer part of the input base bit string X and at a higher position than the least significant bit of the input base bit string X. When the highest-order bit set to one is located on the side of the fractional part of the input base bit string X, the direction signal must be set to indicate a negative shift amount. The absolute value of the direction signal corresponds to how many bits the highest-order bit set to one is apart from the least significant bit of the integer part of the input base bit string X. For example, when the input base bit string X is "010.1011", the base checking section 21 generates and furnishes the shift operation direction signal having a value of +1 to the shifter 20. When the input base bit string X is "000.0011", the base checking section 21 generates and furnishes the shift operation direction signal having a value of −3 to the shifter 20. The shifter 20 performs a shift operation on the input base bit string X according to the value of the shift operation direction signal. When the shift amount indicated by the shift operation direction signal is positive, the shifter 20 shifts the input base bit string X right for a number of bits corresponding to the value of the shift operation direction signal. In contrast, when the shift amount is negative, the shifter 20 shifts the input base bit string X left for a number of bits corresponding to the value of the shift operation direction signal.

The incrementer 22 adds one to the integer part Zint of the selected multiplication bit string Z from the exponent selection unit 6. The invert shifter 23 then shifts the output of the fractional part reverse conversion section 17, i.e., the argument Zf of $2^Z$, where Z is the selected multiplication bit string, in a direction opposite to the direction in which the input base bit string X has been shifted by the shifter 20, according to the output of the incrementer 22. The exponential operation unit 7 thus shifts the position of the base point of the selected multiplication bit string Z and produces a power operation result bit string in a given fixed-point representation. The addition of one to the integer part Zint by the incrementer 22 is needed to compensate for the omission of the integer part of $2^{Zfrc}$ having a value of one, where Zfrc is the fractional part of the selected multiplication bit string Z. This is because, when the fractional part reverse conversion section 17 refers to a base-2 power table with the fractional part Zfrc of the selected multiplication bit string Z, only the argument Zf of $2^Z$, i.e., the fractional part of $2^{Zfrc}$ is obtained, as previously explained in First Embodiment. The other operation of the power operation device of the second embodiment is the same as that of the power operation device of the first embodiment, and therefore the description of the other operation will be omitted hereinafter.

In accordance with the second embodiment of the present invention, the power operation device does not need an exponent bit string conversion unit for converting the input exponent bit string Y into an equivalent fixed-point bit string, thus simplifying the structure of the power operation device and speeding up the operation of the power operation device.

Many widely different embodiments of the present invention may be constructed without departing from the spirit and scope of the present invention. It should be understood that the present invention is not limited to the specific embodiments described in the specification, except as defined in the appended claims.

What is claimed is:

1. A power operation device for performing a power operation on an input base bit string X and an input exponent bit string Y so as to compute $X^Y$, said device comprising:

a logarithm operation unit for performing a base-2 logarithm operation on the input base bit string X and for furnishing a logarithmic base bit string corresponding to the base-2 logarithm of the input base bit string X;

a multiplier for multiplying the logarithmic base bit string by either a bit string equivalent to the input exponent bit string Y or the input exponent bit string Y, and for furnishing a multiplication result as a first multiplication bit string;

a bit operation unit for performing a bit shift operation on the logarithmic base bit string from said logarithm operation unit according to the input exponent bit string Y, and for furnishing the shifted logarithmic base bit string as a second multiplication bit string;

an exponent checking unit for checking whether or not the input exponent bit string Y is the $i^{th}$ power of a base 2 where i is an integer, and for, if so, furnishing a selection signal to direct selection of the second multiplication bit string;

a multiplication bit string selection unit for receiving both the first multiplication bit string from said multiplier and the second multiplication bit string from said bit operation unit, for selecting and furnishing the second multiplication bit string when it receives the selection signal from said exponent checking unit, and for selecting and furnishing the first multiplication bit string otherwise; and an exponential operation unit for performing a base-2 exponential operation on the selected first or second multiplication bit string from said multiplication bit string selection unit, i.e., computing $2^Z$ where Z is the selected first or second multiplication bit string, and for furnishing the computed base-2 exponential value as the power operation result $X^Y$.

2. The power operation device according to claim 1, wherein said exponent checking unit checks whether or not the input exponent bit string Y is ½, and furnishes the selection signal to said multiplication bit string selection unit if so, and wherein said bit operation unit shifts the logarithmic base bit string from said logarithm operation unit right for one bit position and furnishes the shifted logarithmic base bit string as the second multiplication bit string to said multiplication bit string selection unit.

3. The power operation device according to claim 2, wherein the input base bit string X is a bit string in a certain floating-point representation, and said logarithm operation unit includes an argument processing section for computing the logarithm of an argument of the input base bit string X using a base-2 logarithm operation table, a characteristic processing section for subtracting a predetermined characteristic offset value from a characteristic part of the input base bit string X and for furnishing a subtraction result, and a fixed-point bit string generating section for generating the logarithm of a fixed-point base bit string corresponding to the input floating-point bit string X based on the logarithm of the argument of the input base bit string X from said argument processing section and the subtraction result from said characteristic processing section, and wherein said logarithm operation unit can furnish the logarithm of the fixed-point base bit string from said fixed-point bit string generating section as the logarithmic base bit string.

4. The power operation device according to claim 2, wherein the input exponent bit string Y is a bit string in a certain floating-point representation, and wherein said device further includes an exponent processing unit for converting the input exponent bit string Y into an equivalent exponent bit string in a certain fixed-point representation defined by said multiplier.

5. The power operation device according to claim 1, wherein said exponent checking unit checks whether or not the input exponent bit string Y is −1, and furnishes the selection signal to said multiplication bit string selection unit if so, and wherein said bit operation unit inverts the logarithmic base bit string from said logarithm operation unit and furnishes the inverted logarithmic base bit string as the second multiplication bit string to said multiplication bit string selection unit.

6. The power operation device according to claim 5, wherein the input base bit string X is a bit string in a certain floating-point representation, and said logarithm operation unit includes an argument processing section for computing the logarithm of an argument of the input base bit string X using a base-2 logarithm operation table, a characteristic processing section for subtracting a predetermined characteristic offset value from a characteristic part of the input base bit string X and for furnishing a subtraction result, and a fixed-point bit string generating section for generating the logarithm of a fixed-point base bit string corresponding to the input floating-point bit string X based on the logarithm of the argument of the input base bit string X from said argument processing section and the subtraction result from said characteristic processing section, and wherein said logarithm operation unit can furnish the logarithm of the fixed-point base bit string from said fixed-point bit string generating section as the logarithmic base bit string.

7. The power operation device according to claim 5, wherein the input exponent bit string Y is a bit string in a certain floating-point representation, and wherein said device further includes an exponent processing unit for converting the input exponent bit string Y into an equivalent exponent bit string in a certain fixed-point representation defined by said multiplier.

8. The power operation device according to claim 1, wherein said exponent checking unit checks whether or not the input exponent bit string Y is −½, and furnishes the selection signal to said multiplication bit string selection unit if so, and wherein said bit operation unit shifts the logarithmic base bit string from said logarithm operation unit right for one bit position and further inverts the shifted logarithmic base bit string, and furnishes the shifted and inverted logarithmic base bit string as the second multiplication bit string to said multiplication bit string selection unit.

9. The power operation device according to claim 8, wherein the input base bit string X is a bit string in a certain floating-point representation, and said logarithm operation unit includes an argument processing section for computing the logarithm of an argument of the input base bit string X using a base-2 logarithm operation table, a characteristic processing section for subtracting a predetermined characteristic offset value from a characteristic part of the input base bit string X and for furnishing a subtraction result, and a fixed-point bit string generating section for generating the logarithm of a fixed-point base bit string corresponding to the input floating-point bit string X based on the logarithm of the argument of the input base bit string X from said argument processing section and the subtraction result from said characteristic processing section, and wherein said logarithm operation unit can furnish the logarithm of the fixed-point base bit string from said fixed-point bit string generating section as the logarithmic base bit string.

10. The power operation device according to claim 8, wherein the input exponent bit string Y is a bit string in a certain floating-point representation, and wherein said device further includes an exponent processing unit for converting the input exponent bit string Y into an equivalent exponent bit string in a certain fixed-point representation defined by said multiplier.

11. The power operation device according to claim 1, wherein the input base bit string X is a bit string in a certain floating-point representation, and said logarithm operation unit includes an argument processing section for computing the logarithm of an argument of the input base bit string X using a base-2 logarithm operation table, a characteristic processing section for subtracting a predetermined characteristic offset value from a characteristic part of the input base bit string X and for furnishing a subtraction result, and a fixed-point bit string generating section for generating the logarithm of a fixed-point base bit string corresponding to the input floating-point bit string X based on the logarithm of the argument of the input base bit string X from said argument processing section and the subtraction result from said characteristic processing section, and wherein said logarithm operation unit can furnish the logarithm of the fixed-point base bit string from said fixed-point bit string generating section as the logarithmic base bit string.

12. The power operation device according to claim 11, wherein said logarithm operation unit further includes a fixed value holding section for holding the base-2 logarithm of the Napierian number, a base checking section for checking whether or not the input base bit string X is the Napierian number, and for furnishing a fixed value selection signal to direct selection of the base-2 logarithm of the Napierian number if so, and a base output selection section for receiving both the logarithm of the fixed-point base bit string from said fixed-point bit string generating section and the base-2 logarithm of the Napierian number from said fixed value holding section, and for selecting and furnishing the base-2 logarithm of the Napierian number as the logarithmic base bit string when it receives the fixed value selection signal from said base checking section and for selecting and furnishing the logarithm of the fixed-point base bit string as the logarithmic base bit string otherwise.

13. The power operation device according to claim 1, wherein the input exponent bit string Y is a bit string in a certain floating-point representation, and wherein said device further includes an exponent processing unit for converting the input exponent bit string Y into an equivalent exponent bit string in a certain fixed-point representation defined by said multiplier.

* * * * *